United States Patent
Gautron et al.

(10) Patent No.: US 12,347,020 B2
(45) Date of Patent: Jul. 1, 2025

(54) VISIBILITY-BASED ENVIRONMENT IMPORTANCE SAMPLING FOR LIGHT TRANSPORT SIMULATION SYSTEMS AND APPLICATIONS

(71) Applicant: Nvidia Corporation, Santa Clara, CA (US)

(72) Inventors: Pascal Gautron, Speracedes (FR); Carsten Waechter, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 251 days.

(21) Appl. No.: 18/169,387

(22) Filed: Feb. 15, 2023

(65) Prior Publication Data

US 2023/0298257 A1    Sep. 21, 2023

Related U.S. Application Data

(60) Provisional application No. 63/321,767, filed on Mar. 20, 2022.

(51) Int. Cl.

| | |
|---|---|
| *G06T 15/06* | (2011.01) |
| *G06T 15/00* | (2011.01) |
| *G06T 15/04* | (2011.01) |
| *G06T 15/40* | (2011.01) |
| *G06T 15/55* | (2011.01) |

(52) U.S. Cl.
CPC ............ *G06T 15/06* (2013.01); *G06T 15/005* (2013.01); *G06T 15/04* (2013.01); *G06T 15/40* (2013.01); *G06T 15/55* (2013.01); *G06T 2215/12* (2013.01)

(58) Field of Classification Search
None
See application file for complete search history.

(56) References Cited

U.S. PATENT DOCUMENTS

| | | | |
|---|---|---|---|
| 2013/0120384 A1* | 5/2013 | Jarosz | G06F 17/14 345/426 |
| 2016/0314614 A1* | 10/2016 | Bitterli | G06T 15/55 |
| 2018/0018814 A1* | 1/2018 | Dahm | G06N 3/08 |
| 2019/0299097 A1* | 10/2019 | Hadjadj | G06T 15/005 |
| 2022/0036641 A1* | 2/2022 | Vorba | G06T 15/06 |

\* cited by examiner

*Primary Examiner* — Peter Hoang
(74) *Attorney, Agent, or Firm* — Hogan Lovells US LLP

(57) ABSTRACT

Systems and methods to implement a technique for determining an environment importance sampling function. An environment map may be provided where lighting information about the environment is known, but where certain pixels within a scene associated with the environment map are shaded. From these shaded pixels, rays may be drawn in random directions to determine whether the rays are occluded or can interact with the environment map, which provides an indication of a source of lighting that can be used for light transport simulations. A mask may be generated based on these occlusions and used to update the environment importance sampling function.

20 Claims, 13 Drawing Sheets

VISIBILITY-BASED ENVIRONMENT IMPORTANCE SAMPLING FOR LIGHT TRANSPORT SIMULATION SYSTEMS AND APPLICATIONS

CROSS-REFERENCE TO RELATED APPLICATIONS

This application claims priority to and the benefit of U.S. Provisional Patent Application No. 63/321,767, filed Mar. 20, 2022, titled "VISIBILITY-BASED ENVIRONMENT IMPORTANCE SAMPLING FOR LIGHT TRANSPORT SIMULATION SYSTEMS AND APPLICATIONS," the full disclosure of which is hereby incorporated in its entirety for all purposes.

BACKGROUND

Computing the amount of light received at a given point in a three-dimensional (3D) scene typically requires sampling the hemisphere above that point, and tracing rays from the point to determine its incoming radiance. In a scene with illumination represented using a spherical environment map, state-of-the-art methods use importance sampling to trace rays towards the elements depicted in the environment map perceived as the most important or most impactful to the scene. For example, the importance sampling function for a map representing an open sky would give a higher importance to the few pixels representing the sun, and less importance to the majority of pixels representing the sky. The importance function is typically computed upon loading the environment map. This technique works well in turntable scenes where most visible points have an unoccluded view of the environment map. However, in interior scenes, the importance function may actually slow down convergence because even if the sun is not visible from any of the shaded points, importance sampling will still guide the rays towards it. Ideally, the importance sampling should also consider the openings (e.g., windows) in a scene.

Many approaches have been developed that attempt to fix this issue, as well as the general challenge of using ray guiding for global illumination. Typical approaches need to "learn" a localized importance function on-the-fly, and use it for further sampling. However, those approaches tend to be complex while providing variable improvements or degradations depending on the scene. Furthermore, ray guiding techniques tend to suffer from under-sampling, since the importance sampling should be somewhat proportional to the actual function that is sampled. To learn a high-quality importance function, the algorithm needs many samples, which could also be used to estimate the incoming radiance directly. As long as the importance function estimate is not accurate, the sampled distribution may misguide rays and slow the convergence.

BRIEF DESCRIPTION OF THE DRAWINGS

Various embodiments in accordance with the present disclosure will be described with reference to the drawings, in which.

DETAILED DESCRIPTION

Approaches in accordance with various embodiments overcome these and other deficiencies associated with importance sampling incoming light contributions at different points or pixels of an image or animation (e.g., multiple frames). Specifically, embodiments provide for a mask that may be continuously updated to identify areas where lighting may affect one or more pixels within a frame. An environment map may be provided where lighting information about the environment is known. Within a selected pixel, one or more rays may be traced from positions in the scene representation into random, or deterministic (such as quasi-Monte Carlo based sampling methods), directions, a process known in light transport simulation (e.g., computer graphics) as Next Event Estimation (NEE). Points may then be identified, along the ray, to determine whether the ray hits an occlusion or if the ray can interact with a light source in the environment map, such as the sun. The rays without occlusion may then be recorded. The process may be repeated for one or more (e.g., each) pixel(s) and a mask may be generated, in addition to the environment map, that records different regions that provide light that may be used to illuminate scene elements within a frame. This mask may be updated for one or more (e.g., each, every other, etc.) frame(s). The mask may be generated for each frame or may be taken from a previous frame and updated with new information. The information from this mask may then be used to extract an importance sampling function for use with illuminating a frame, for example, by improving the selection into which directions to trace rays to, in order to efficiently find important light transport paths that connect a light source in the environment map with each pixel.

Various other such functions can be used as well within the scope of the various embodiments as would be apparent to one of ordinary skill in the art in light of the teachings and suggestions contained herein.

Figure 1A:
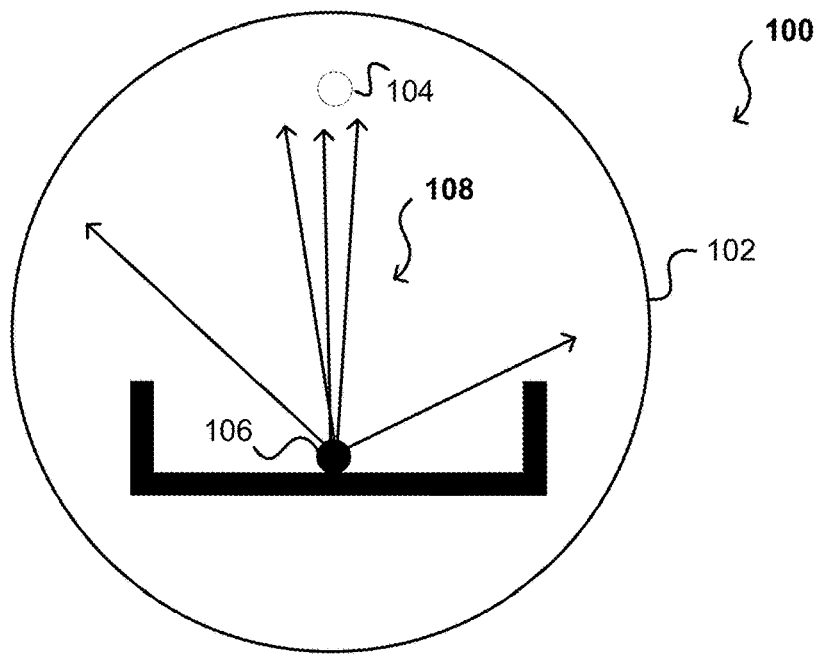
FIGS. 1A and 1B illustrate images of a scene including an object and an associated environment map, according to at least one embodiment.
Figure 1B:
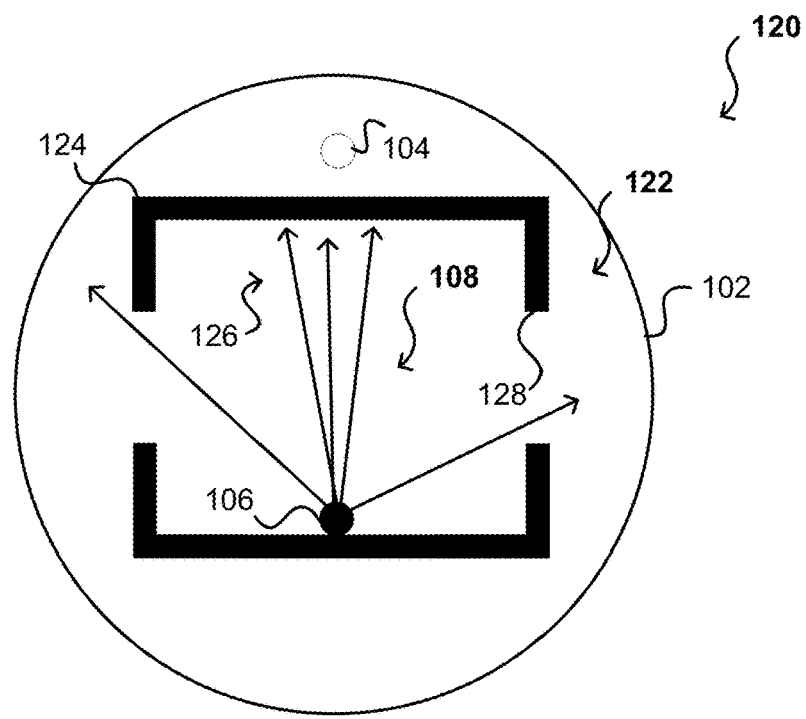

FIGS. 1A and 1B illustrate examples of environment sampling for a given frame that may be part of a sequence of frames, such as a rendered video. For a first scene 100 in FIG. 1A, an environment 102 is illustrated that is illuminated by one or more light sources 104, which in this example may be the sun for an outdoor scene. The one or more light sources 104 may correspond to a number of pixels forming an object or source within an area, but may generally be referred to as a "light source" to describe one or more pixels. Light transport simulation can be used to determine how to light or shade each pixel of an object 106 positioned within the scene 100. As noted, the object 106 may be represented by a number of pixels, where one or more individual pixels represent a surface area of the object 106 that is illuminated or otherwise interacts with light within the scene. The lighting or shade of the object may include determining a color or pixel value based at least on an estimation of a computed integral, such as for an amount of illumination at that point on the object 106. Such a simulation can be used to determine other information as well, as may relate to global illumination, ambient occlusion, shader effects, and the like. Since it may not be practical in some instances to sample all incoming light rays or to compute the integral analytically for all pixels, particularly for time-sensitive applications such as online gaming, some amount of sampling is typically performed that can serve as a representative measure of an aspect such as illumination, for example, that can then be applied to nearby pixels of the object 106. This can include applying a representative illumination value to pixels in a hash cell of an object.

To determine how to illuminate the object 106, and/or specific pixels of the object 106 because each portion of the object 106 may not be illuminated in the same manner, ray tracing may be used to identify a contribution of a particular light source within the scene 100. For example, an environment map may be used to identify one or more regions that may provide a source of illumination, such as the sun as the light source 104 in the illustrated example. The sun may provide significantly more illumination than pixels representing the nearby sky, and as a result, the illumination from the light source 104 may be deemed more important than other sources and/or other pixels within the environment.

Ray tracing may be used to trace rays toward the elements within the environment 102 providing sources for illumination. In this example, a number of rays 108 are traced from the object 106, and/or a specific pixel of the object 106, in random directions into the environment 102. As shown, a majority of the rays 108 are traced toward the light source 104 because information associated with the environment map may indicate that the light source 104 is the most important (e.g., greatest contributing) source of light within the scene 100. Accordingly, an importance sampling function for the illustrated scene 100 representing an open sky gives higher importance to the pixels representing the light source 104 and less to a majority of pixels within the sky or surrounding areas.

While techniques shown in FIG. 1A may be useful for a typical outdoor scene, the importance function may slow down convergence when the light source 104 is not directly visible. For example, in a second scene 120 represented in FIG. 1B, the object 106 is positioned within an interior space 122, such as within a building, that includes a cover 124 that blocks rays 108 from being shot directly toward the light source 104. As such, the cover 124 may be considered an occlusion with respect to at least some of the rays 108.

In this example, a group 126 of rays 108 are occluded because importance sampling for the environment 102 may indicate that the light source 104 provides the most illumination without considering how other environmental features, such as the cover 124, changes the interaction with the light. While some light is still provided through the openings 128, it may take longer to learn a localized importance function to recognize the source of light through the openings 128. The delay in identifying this localized importance function may be significant enough to change a user experience, such as in an online gaming environment and/or another real-time or near real-time application where latency has a noticeable impact on user experience. Embodiments of the present disclosure address such problems with a simplified and effective solution.

Embodiments of the present disclosure overcome the under-sampling problem of ray guiding by generating a single, high-quality importance sampling function aggregating the visibility of all shaded points within a (set of) rendering iteration(s). In contrast to existing approaches, embodiments of the present disclosure provide improved simplicity and robustness. In one or more embodiments, the aggregation of some (e.g., all) visibility tests provides enough information for a reliable importance sampling function in a single iteration, hence avoiding the need for temporal filtering and/or limitation to static scenes. The possibility to automatically enable/disable the importance regeneration results in an absence of overhead in turntable scenes, and fast convergence in occluded environments. Existing approaches tend to use heuristics and a few rays in an attempt to estimate a varying importance function for each shaded point, making them prone to under-sampling. In contrast, embodiments of the present disclosure apply the importance sampling function as a global resource, which can be enriched by each visibility test.

In one or more embodiments, during rendering, one or more individual rays traced towards the environment will be used to update an environment-map-sized mask, indicating whether the corresponding environment map pixel was occluded. After a number of iterations, the importance sampling function is regenerated by combining the pixel values of the map with the mask, hence drawing more importance towards the elements of the environment map that actually contribute to the currently visible points.

Further exploration is provided by using Multiple Importance Sampling (MIS), where sample directions are randomly drawn either from the surface reflectance function or from the environment importance sampling function. In the context of real-time rendering, the regeneration of the importance sampling function must be very efficient, for example using techniques like Alias Maps or Cutpoint Maps.

In one or more embodiments, the base algorithm for environment lighting may include the following steps: at operations 1 (before rendering), an importance sampling function is created from the environment map intensity, and a mask the same size as the environment map is allocated. At operations 1, for each rendering iteration, n random directions are determined from each shaded point p. In one or more embodiments, the n directions may be determined by importance sampling the reflectance function of the surface at p. At operations 2, a ray is traced for each of the n directions. If the ray is unoccluded, the corresponding environment map pixel is marked. At operations 3, m random directions are determined from p by importance sampling the environment map importance function. In one or more embodiments, a ray is traced for each of the m directions. If the ray is unoccluded, the corresponding environment map pixel is marked. At operations 4, Multiple Importance Sampling is applied to combine both contributions into the incoming radiance estimate for point p. At operations 5, the environment importance sampling function may be regenerated using only the marked environment map pixels.

According to one or more embodiments, this base algorithm can be enhanced by using a non-binary mask, e.g., by counting the number of unoccluded rays hitting each environment map pixel, the importance of each pixel with better accuracy can be adjusted. In one or more embodiments, the algorithm may also be enhanced by using a mask spreading in environment map space. In one or embodiments, a filter—for example a simple box filter or Gaussian filter—can be applied on the map before regenerating the importance sampling function. In one or more embodiments, the algorithm may be further enhanced by using a simple BSDF (or cosine) sampling in the first frame(s) instead of the original environment importance function. This can be particularly useful in highly occluded environments, where visibility is the main factor. In one or more embodiments, the algorithm may be further enhanced by updating the importance sampling function every N (e.g., 4) iterations. Such an approach not only reduces the risk of undersampling, but also reduces the overhead of regenerating the importance function. In one or more embodiments, the algorithm may also be enhanced by embedding the mask within the environment map itself to improve cache coherency. For example, the mask can be stored in the sign bit of the probability of one or more (e.g., each) environment map pixel. In one or more embodiments, the algorithm may also be enhanced by counting the number of unique environment map pixels in the mask. For example, if this count is above a given threshold, it may be beneficial to use the original importance sampling function and save the cost of regeneration. When the count becomes lower than the threshold, the algorithm can enable or activate the regeneration.

Figure 2A:
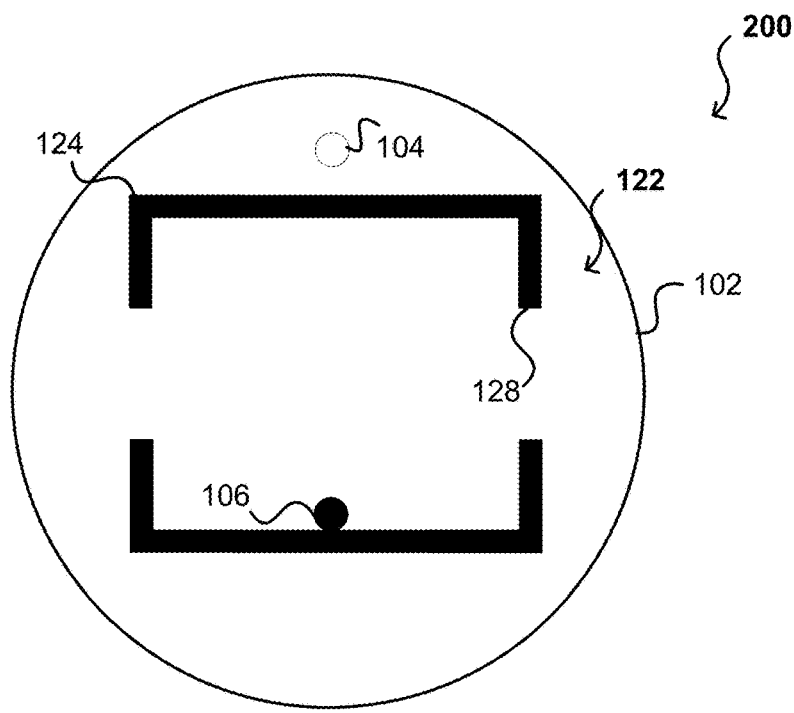
FIG. 2A illustrates an image of a scene including an object within an interior structure, according to at least one embodiment.
Figure 2B:
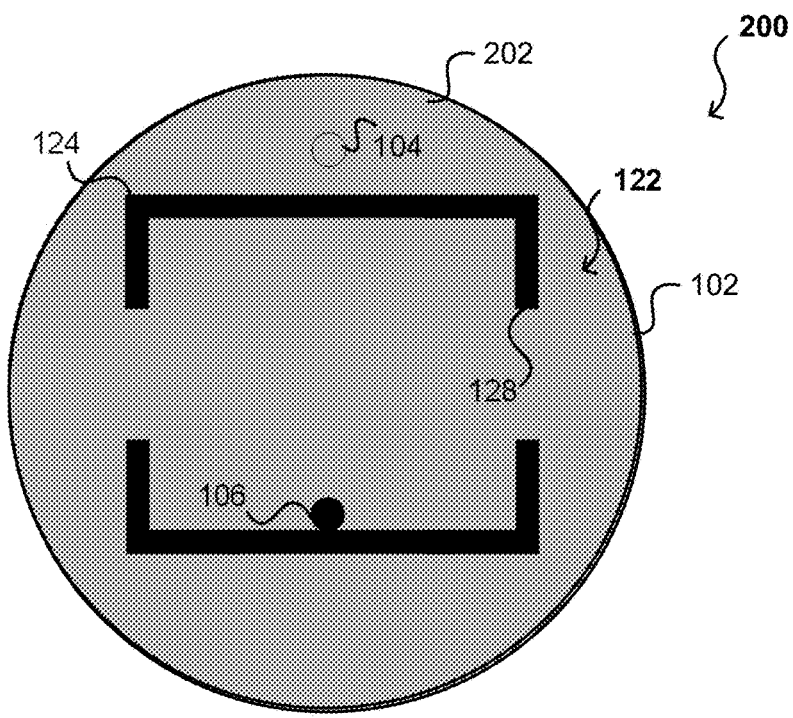
FIG. 2B illustrates an image of a scene including a mask, according to at least one embodiment.

FIGS. 2A and 2B illustrate examples of environment sampling for a given frame that may be part of a sequence of frames. A first scene 200 in FIG. 2A illustrates the environment 102 in which the object 106 is positioned within the interior structure 122 having the cover 124 and openings 128. In one or more embodiments, the first scene 200 may correspond to the second scene 120. A two-dimensional (2D) scene is shown for clarity with the present discussion, but techniques in accordance with embodiments of the present disclosure may be applied to three-dimensional (3D) scenes. In this example, the entire scene 200 is illustrated within the environment 102 before rendering. Accordingly, the illustration is for example purposes and may not be presented to a user, for example, on a display. Prior to rendering, information with respect to the environment 102 may be known; Non-limiting examples of this information may include: particular pixel locations of the light source 104, object positions within the environment 102, additional lighting sources, and/or the like. Based on this information, an importance sampling function may be generated from the environment map intensity. As one non-limiting example, if the light source 104 is the sun, then the important sampling function may place greater importance on the pixels corresponding to the light source 104 because these pixels are likely to provide the greatest illumination to objects within the scene 200.

The object 106 is shown arranged within the interior structure 122 and will be illuminated by the lighting effects associated with the environment 102 when rendered. In order to accurately illuminate the object 106, embodiments generate an important sampling function aggregating the visibility of all shaded points (points covered by the cover 124) within a set of rendering iterations. FIG. 2B illustrates a mask 202, shown as a shaded region covering a substantial portion of the environment 102. The mask 202 may be approximately the same size as the environment 102, but in various embodiments, the mask 202 may be smaller than the environment 102. In this example, the mask 202 assumes the entire environment 102 is occluded. Accordingly, the mask 202 is used to identify areas that are unoccluded because, by default, an area will be shown as occluded with the mask 202, unless otherwise determined. Such an approach may be useful in reducing time to generate the importance sampling function because only known areas that are unoccluded will be identified, rather than shooting rays to find occlusions.

FIG. 3A-3D illustrate examples of environment sampling for a given frame that may be part of a sequence of frames. In this example, a first scene 300 in FIG. 3A (which may correspond to the scenes 120, 200) is shown within the environment 102 and rays 108 are drawn from the object 106, or from a pixel associated with the object 106. The object 106 may be considered a shaded portion in that it is covered, at least in part, by the cover 124. In other words, a ray shot directly from the light source 104 will not reach the object 106 due to the occlusion via the cover 124. The object 106 may be considered as a point p representing a pixel of the object and a number of rays 108 are drawn from the object 106 in a random number n directions by importance sampling a reflectance function of the surface at p. As shown, the rays 108 are directed toward the openings 128 because that corresponds to the source of illumination for the interior structure 122.

For each of the random number n directions, an individual ray 108 is traced in the specified direction out into the environment 102, which may correspond to pixels within an environment map. If the ray is unoccluded, the corresponding environment map pixel may be marked or otherwise recorded. This process may be repeated for any number of pixels, whether the pixels are associated with the object or not. In certain embodiments, any number (e.g., each) pixel within the scene may be selected for tracing. In other embodiments, only particular objects are selected. Furthermore, in certain embodiments, less than all of the pixels within the scene and/or associated with an object are selected. For example, for high resolution images, there may be thousands of pixels to choose from, and as a result, even if only a subset are selected, there will still be thousands of rays to provide data regarding occluded environment map pixels.

Figure 3A:
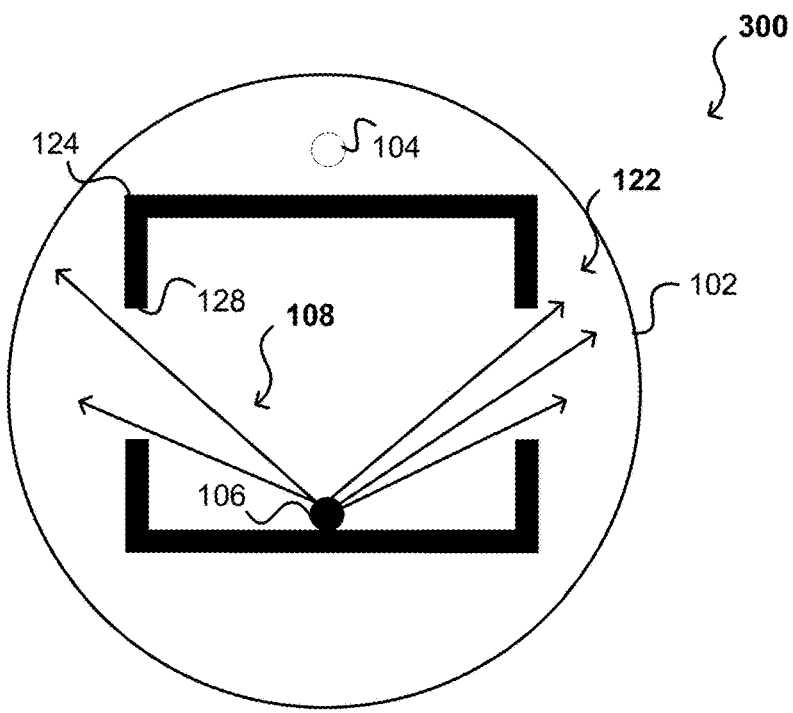
FIG. 3A illustrates an image of a scene including rays, according to at least one embodiment.
Figure 3B:
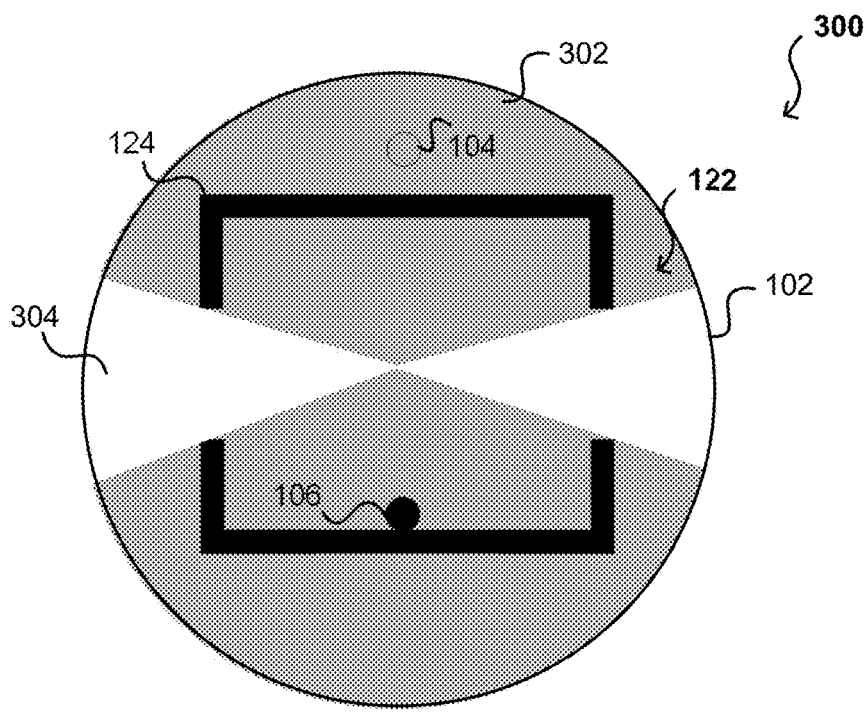
FIG. 3B illustrates an image of a scene including a mask, according to at least one embodiment.

FIG. 3B illustrates an updated mask 302, which may be considered an iteration or a refinement of the mask 202. As shown, mask 302 includes areas 304 corresponding to environment map pixel locations that were not occluded when the rays 108 were traced from one or more pixels. Accordingly, at least a portion of the environment 102 is no longer masked. The identification of these unoccluded pixels within the areas 304 may permit a refined environment importance sampling function, as will be further described herein. As described herein, the mask 202 and/or the mask 302 may be initially generated and/or taken from a previous frame and then updated. For example, in at least one embodiment, the mask 302 may be obtained from a previous frame and then modified based on information associated with the rays shown in FIG. 3A. In other embodiments, a blank mask may be generated for each frame and then ray information from the rays may be used to update the blank mask.

Figure 3C:
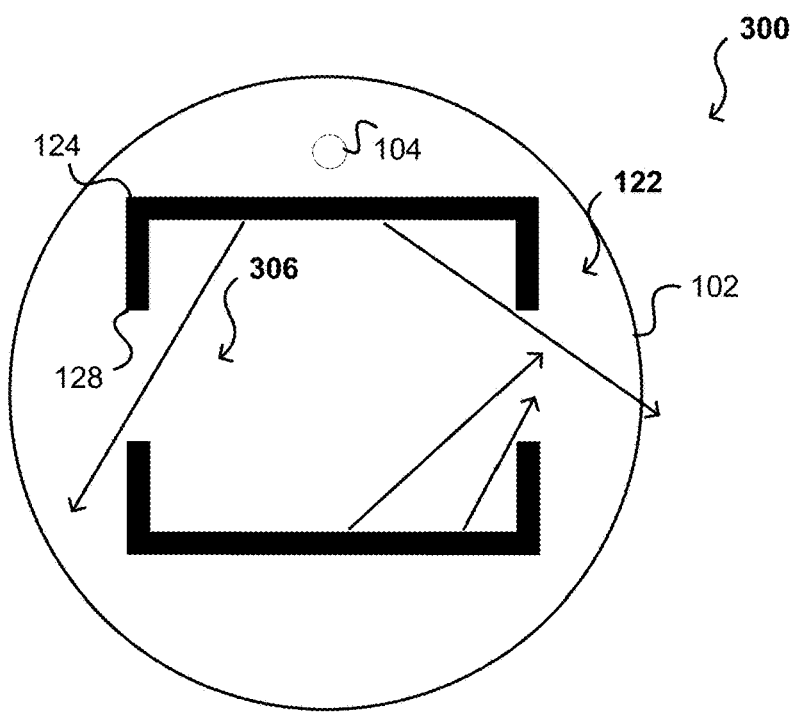
FIG. 3C illustrates an image of a scene including rays, according to at least one embodiment.
Figure 3D:
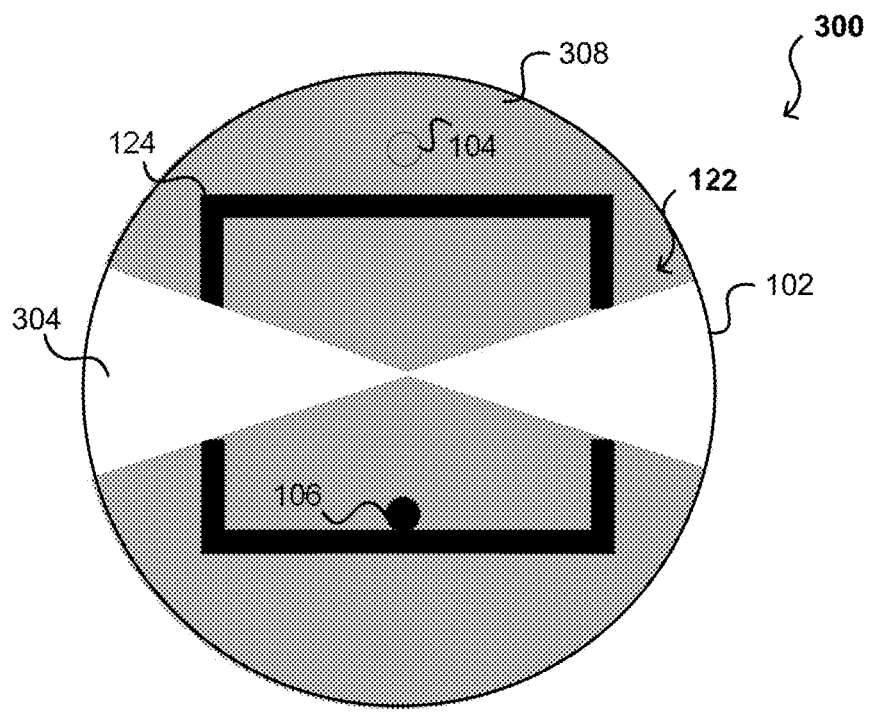
FIG. 3D illustrates an image of a scene including a mask, according to at least one embodiment.

FIG. 3C illustrates the first scene 300 in which additional rays 306 are drawn. In this example, at least some of the rays originate from a different location. For example, in at least one embodiment, directions of the rays may be based on importance sampling the environment map importance function. As shown, the additional rays 306 correspond to rays that are not occluded, and as a result, extend to one or more pixels within the environment map. For example, ray directions may be drawn in m random directions from one or more points p by importance sampling the environment map importance function. Then, for each of the m directions, a ray may be traced in that direction and, if the ray is unoccluded, the corresponding environment map pixel may be marked. These locations may be combined with the previously determined locations, such as by using MIS, to combine both contributions into an incoming radiance estimate. The identified pixels may then be used to generate a refined mask 308, which includes the areas 304, as shown in FIG. 3D. The area 304 is larger than the area 304 in FIG. 3B, illustrating an increased region that provides illumination for different surfaces and pixels associated with the interior space 122. This increased area may be due to the combination of marked environment map pixels from sampling based on both the reflectance function and the environment map importance function. Having the refined mask 308 may be used when the environment is regenerated such that the environment importance sampling function only uses the unmasked portions of the environment map pixels, or weights the masked pixels according to some heuristic.

Figure 4:
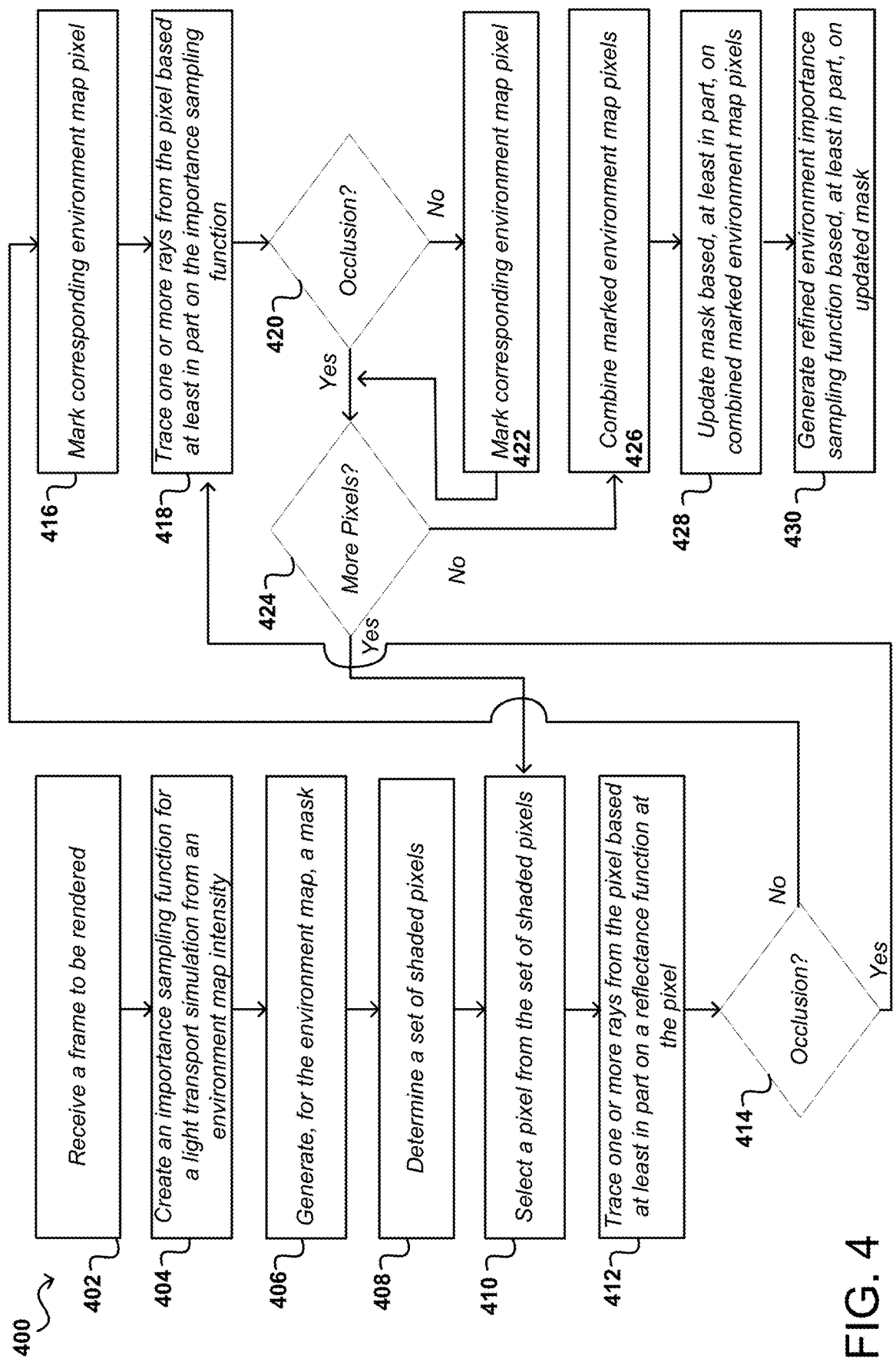
FIG. 4 illustrates an example flow chart of a process for generating an environment importance sampling function, according to at least one embodiment.

FIG. 4 illustrates an example process 400 for generating an environment importance sampling function. It should be understood that for this and other processes presented herein that there can be additional, fewer, or alternative operations performed in similar or alternative order, or at least partially in parallel, within the scope of various embodiments unless otherwise specifically stated. In this example, a frame to be rendered is received 402. The frame may be one frame within a sequence of frames. In certain embodiments, one or more (e.g., each, according to some interval, etc.) frame(s) for a sequence of frames, such as for a video, may be evaluated. In other embodiments, a subset of a total number of frames may be evaluated and importance sampling may be extended or otherwise used for a number of frames.

An importance sampling function for a light transport simulation may be created based on an environment map intensity 404. For example, information for a given environment may be known prior to rendering and the importance sampling function may be based on this information. In at least one embodiment, the importance sampling function includes at least a determination of one or more light sources within a scene. A mask may be generated for the environment map 406. In one or more embodiments, the mask may be substantially equal in size to the environment map and may represent occluded pixels. As such, a masked pixel may not be used as a source of light or illumination. Furthermore, in one or more environments, the mask may be obtained from a previous frame. That is, instead of generating a blank mask, a previously generated mask may be reused and then updated, as described herein.

In at least one embodiment, a set of shaded pixels is identified 408. A shaded pixel may correspond to a pixel that is covered or otherwise occluded from one or more light sources. The shaded pixels may be known based on information within the environment map, such as a location of one or more objects with respect to other objects within the scene. A pixel may be selected from the shaded pixels 410 and one or more rays may be traced from the selected pixel 412. The one or more rays may be drawn in n random directions by importance sampling a reflectance function of a surface at the selected pixel p. The rays may be drawn extending outwardly from p toward the environment and it may be determined whether or not the rays are occluded based, at least in part, on a determination of an interaction within the environment map 414. For example, a ray may be occluded if the ray that encounters a pixel correspond to an object other than a light source prior to or without extending to intersect or interact with a light source or background element. However, a ray may be unoccluded if it encounters or otherwise interacts with an environment map pixel corresponding to a light source or a background element.

If there is no occlusion, then the environment map pixel may be marked 416 or otherwise identified. In at least one embodiment, additional rays may be traced from the selected pixel p based at least in part on the environment map importance function 418. Similarly, this second set of ray tracing may also be performed if it is determined that there is an occlusion. The second set of rays is then evaluated for occlusions 420. If there are no occlusions, the corresponding environment map pixels are also marked 422. If there is an occlusion, then there may be a determination whether or not there are additional pixels of the set of shaded pixels 424. If so, then the process my repeat. If not, then the determined marked environment map pixels may be combined 426 to update the mask 428. In at least one embodiment, the updated mask may then be used to generate a refined environment importance sampling function 430.

Figure 5A:
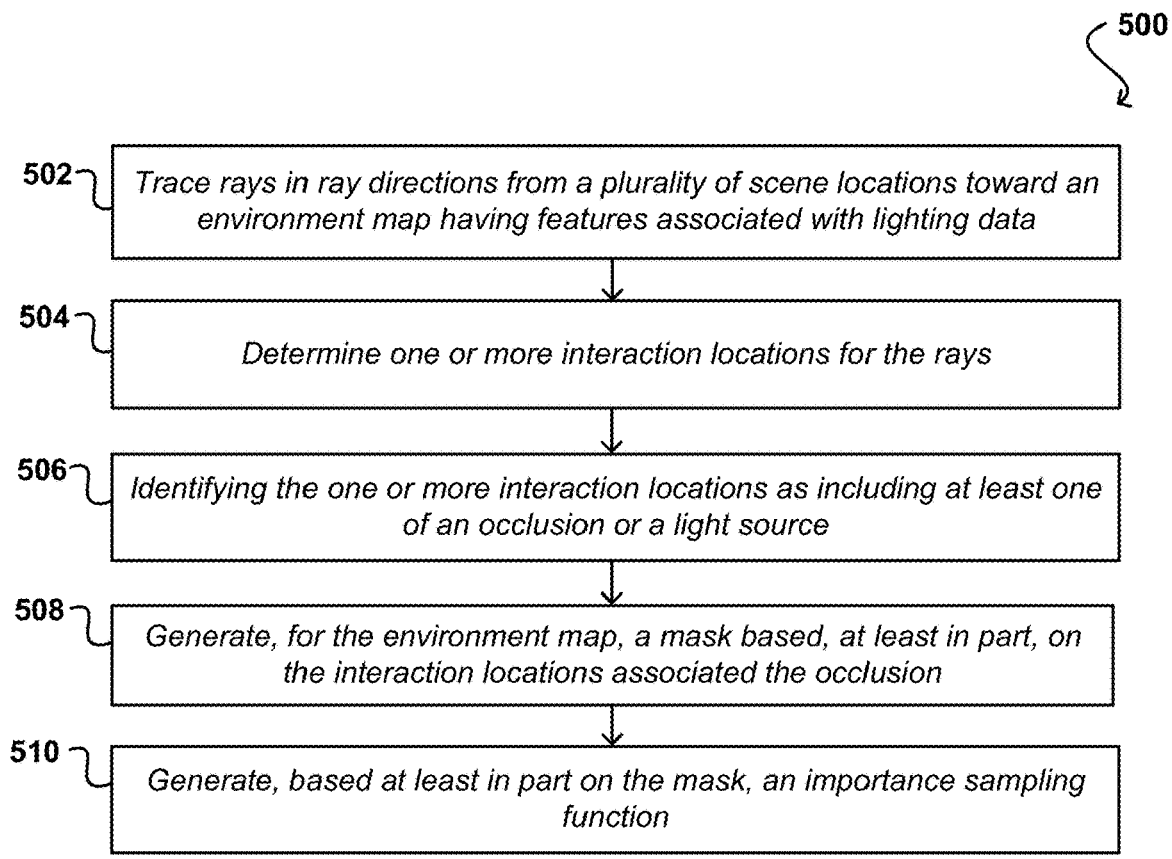
FIG. 5A illustrates an example flow chart of a process for generating an environment importance sampling function, according to at least one embodiment.

FIG. 5A illustrates an example process 500 for generating an importance sampling function. In this example, rays may be traced in ray directions from a plurality of scene locations 502. The rays may be traced in a random number of directions, and moreover, a random number of rays may be selected to be traced. The rays may be traced toward the environment map, which may include one or more features, which may be associated with different attributes, such as lighting data. In various embodiments, the lighting data may be captured or artistically generated.

In at least one embodiment, one or more interaction locations are determined for the rays 504. For example, interactions may include mathematically determining whether the ray can contact or otherwise overlap a portion of a pixel. The interaction may then be determined as being associated with at least one of an occlusion or a light source 506. For determinations that the interaction is an occlusion, a mask may be developed 508 to determine areas of the environment that are associated with occlusions and those that are associated with light sources. Based at least in part on the mask, an importance sampling function for the environment map may be generated 510.

Figure 5B:
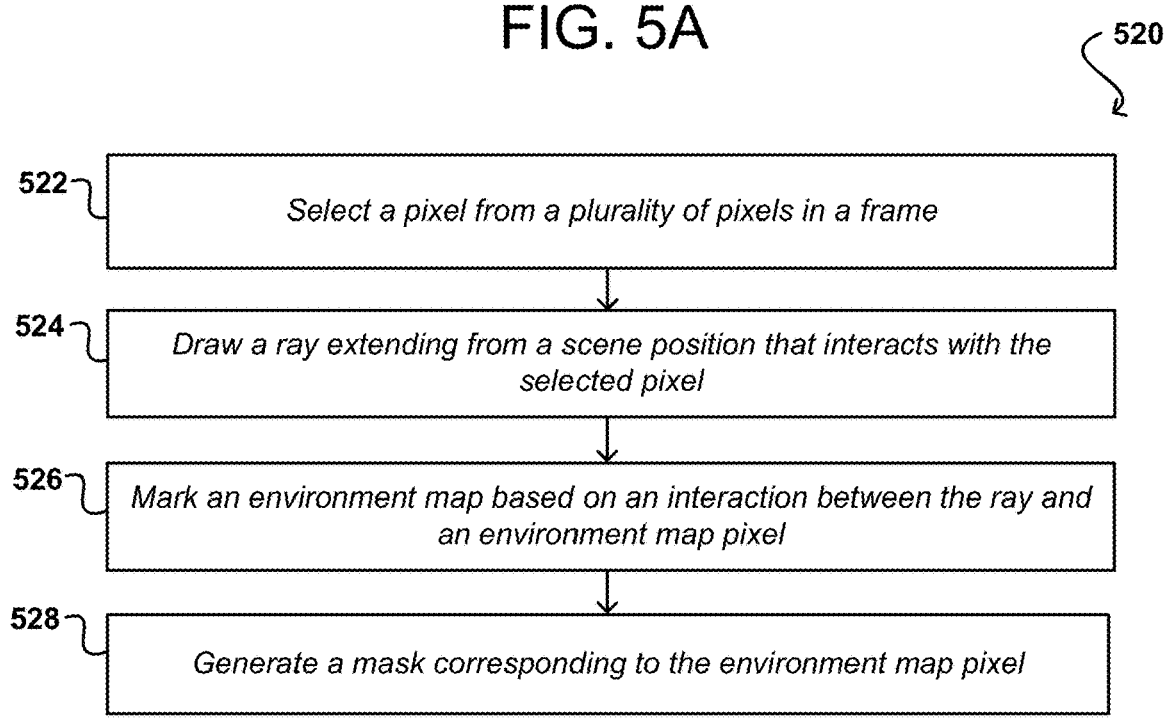
FIG. 5B illustrates an example flow chart of a process for generating an environment mask, according to at least one embodiment.

FIG. 5B illustrates an example process 520 for generating a mask for an environment map. In this example, a pixel is selected from a plurality of pixels in a frame 522. A ray may be drawn to extend from a scene position that interacts with the selected pixel 524. In at least one embodiment, an environment map is marked based on an interaction between the ray and an environment map pixel 526. A mask may then be generated corresponding to the environment map pixel 528.

Figure 6A:
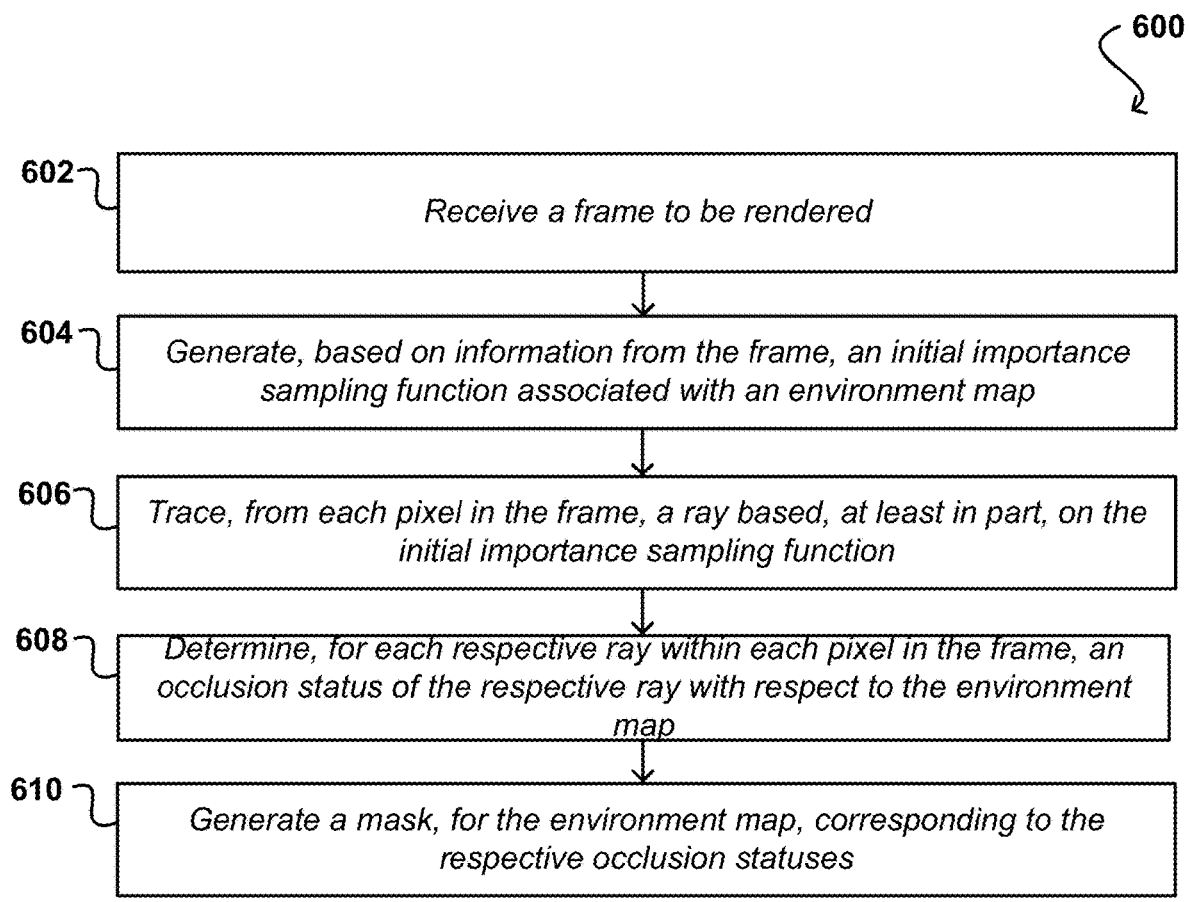
FIG. 6A illustrates an example flow chart of a process for generating an environment mask, according to at least one embodiment.

FIG. 6A illustrates an example process 600 for generating a mask based on pixel occlusion status. In this example, a frame to be rendered is received 602 and an initial importance sampling function is generated on an associated environment map of the frame 604. In at least one embodiment, a ray is traced from one or more (e.g., each) pixel in the frame based, at least in part, on the initial importance sampling function. For each of these traced rays, an occlusion status of the respective ray is determined with respect to the environment map 608. Based at least in part on the occlusion status, a mask may then be generated for the environment map 610.

Figure 6B:
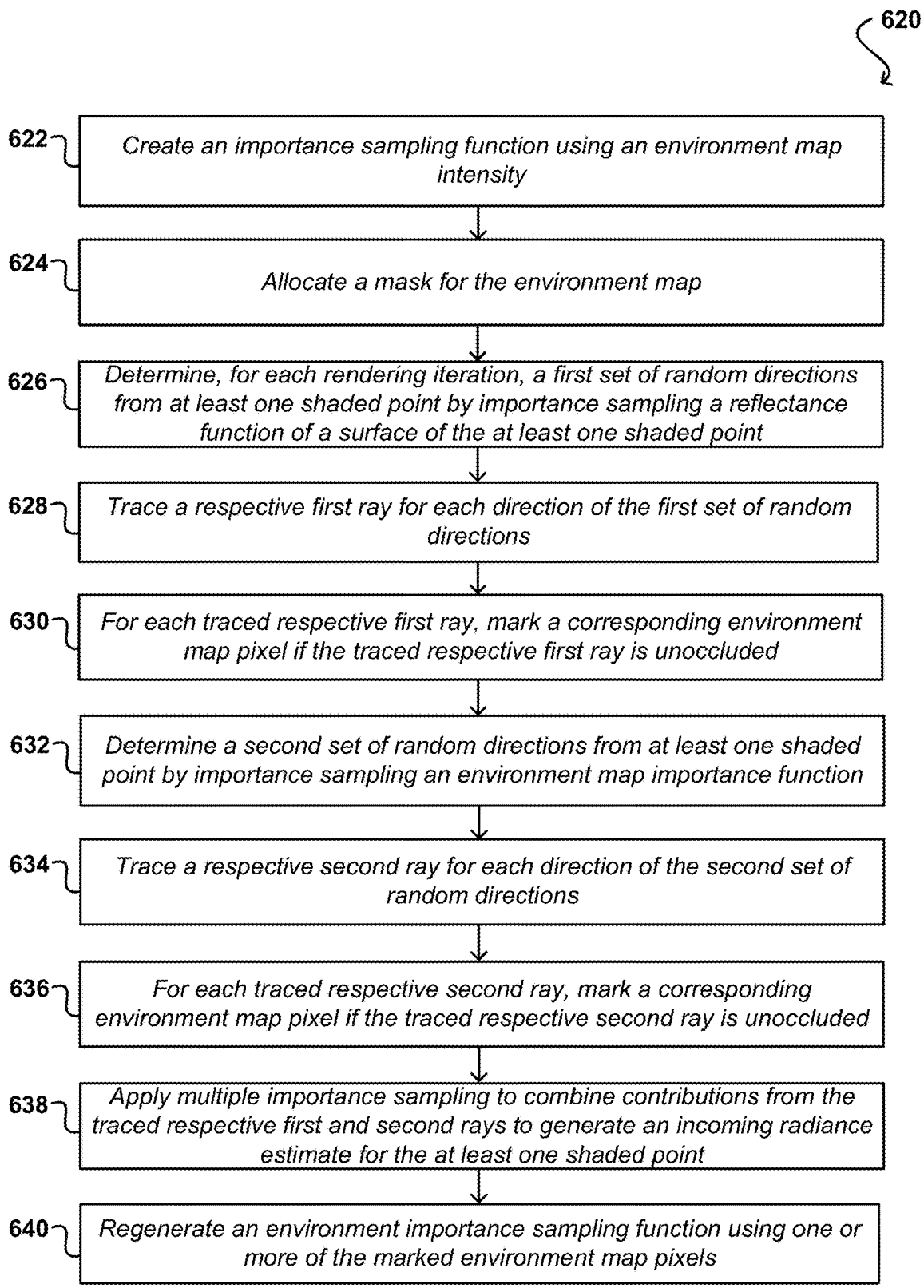
FIG. 6B illustrates an example flow chart of a process for generating an environment importance sampling function, according to at least one embodiment.

FIG. 6B illustrates an example process 620 for generating an environment importance sampling function. In this example, an importance sampling function is created using an environment map intensity 622. In at least one embodiment, a mask is then allocated for the environment map 624, where the mask may be the same size as the environment map. For one or more (e.g., each) rendering iteration, embodiments provide for determining a first set of random directions from at least one shaded point by importance sampling a reflectance function of a surface of the at least one shaded point 626. In various embodiments, a ray may be traced in one or more (e.g., each) direction for the first set of random directions 628. Additionally, in at least one embodiment, corresponding environment pixels may be marked for these rays when the ray is unoccluded 630.

In at least one embodiment, a second set of random directions form at least one shaded point is also determined, for example by importance sampling the environment map importance function 632. Additional rays may then be traced for one or more (e.g., each) direction of the set of random directions 634 and corresponding environment pixels may be marked when the rays are unoccluded 636. Contributions from the traced rays may be combined 638, for example by applying multiple importance sampling. As a result, an incoming radiation estimate for at least one shaded point may be generated. Accordingly, the environment importance sampling function may then be regenerated using one or more of the marked environment map pixels 640.

Data Center

Figure 7:
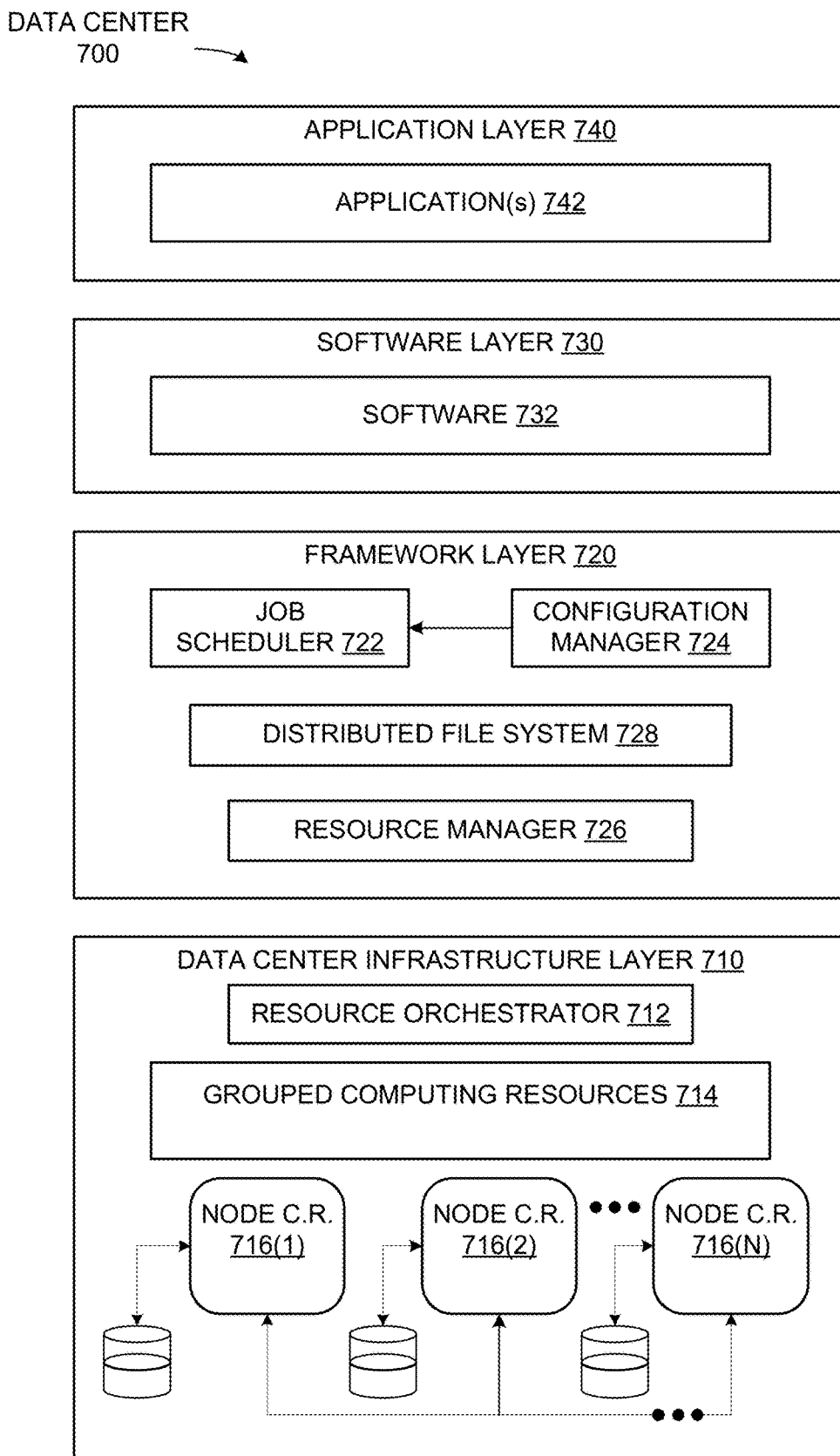
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underused and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for importance sampling.

Computer Systems

Figure 8:
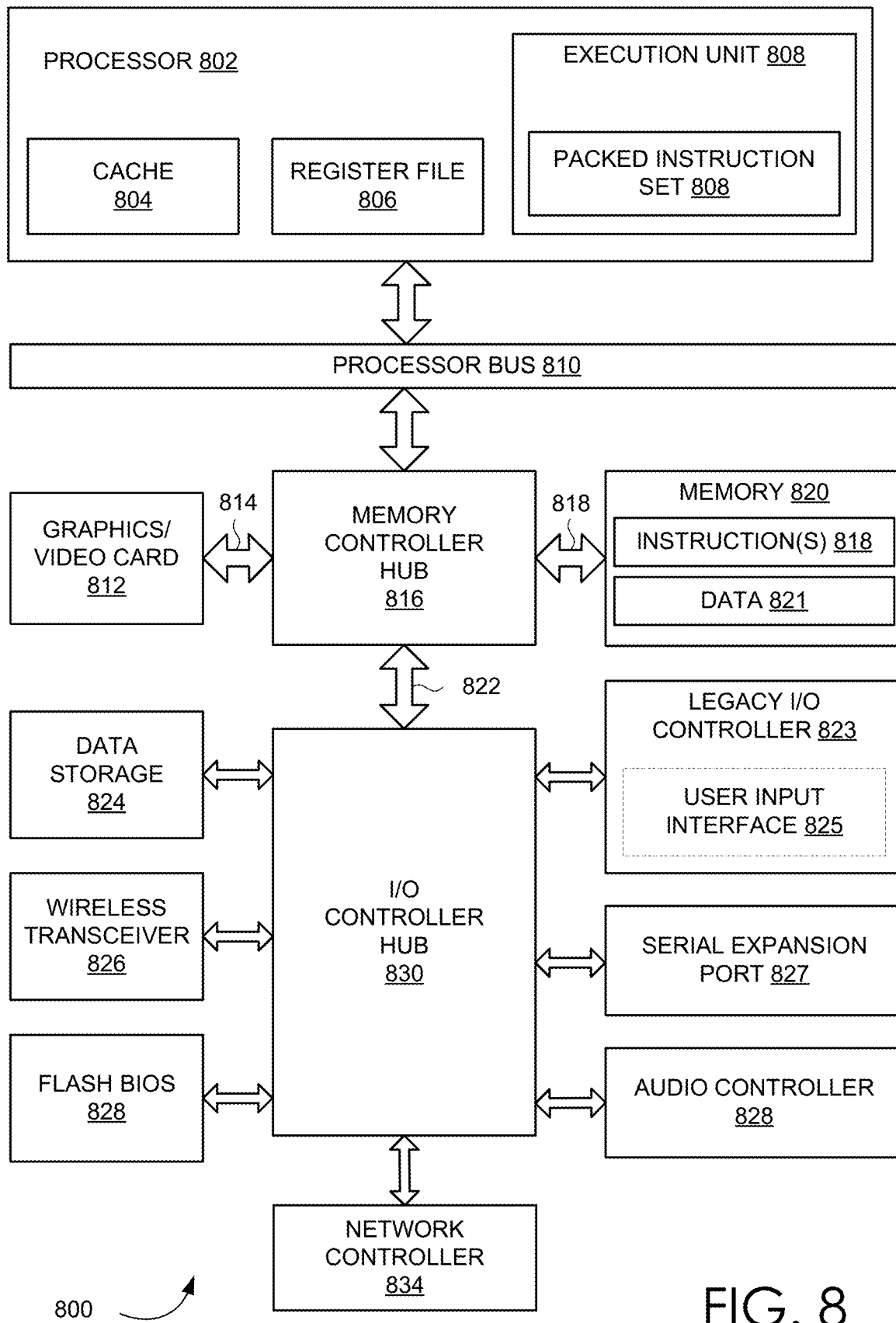
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for importance sampling.

Figure 9:
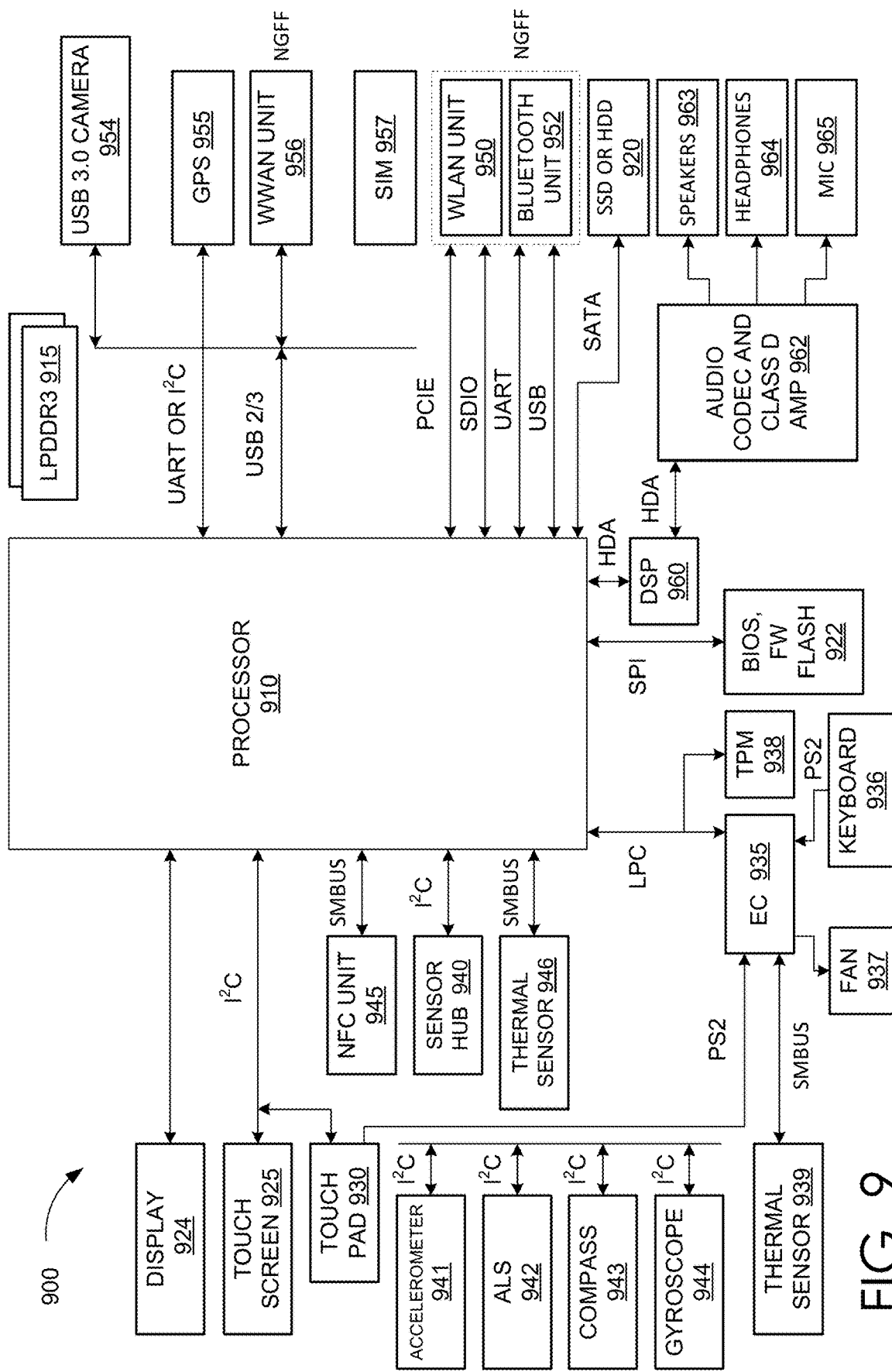
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for importance sampling.

Figure 10:
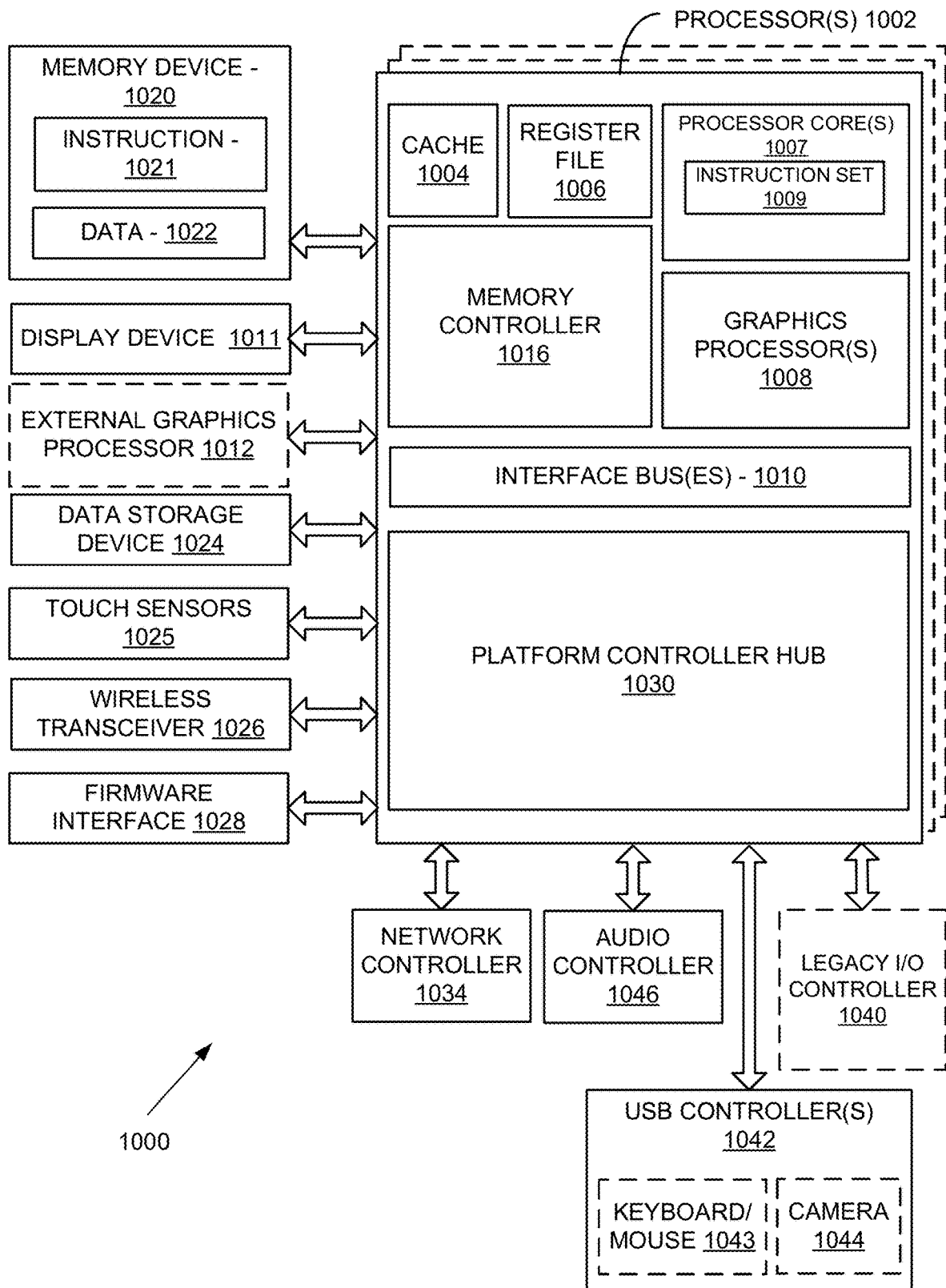
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for importance sampling.

Figure 11:
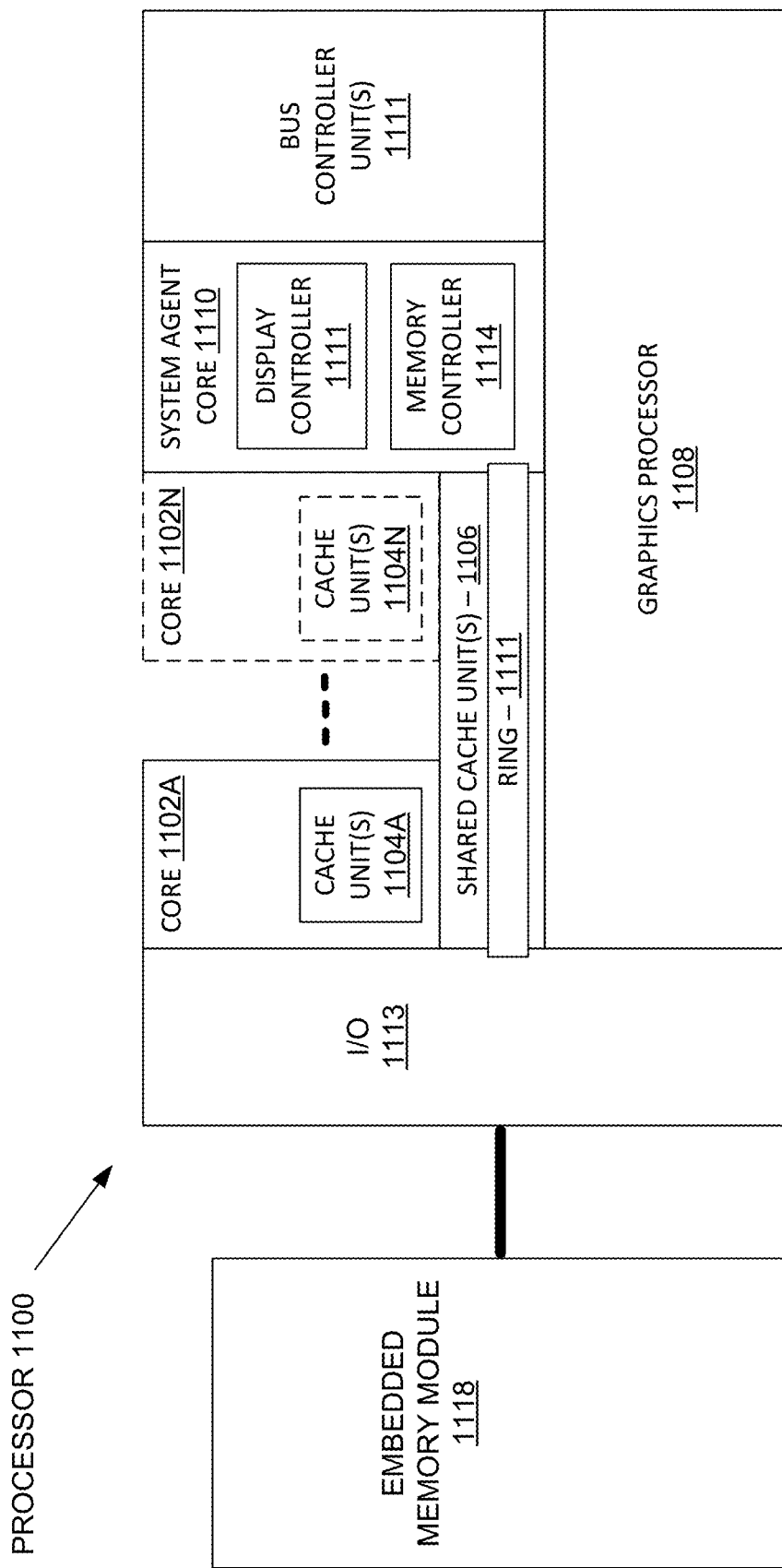
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for importance sampling.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
one or more processing units to:
trace one or more respective rays from a plurality of scene locations of a scene represented using an environment map that includes one or more features corresponding to lighting information;
determine one or more respective interaction locations for the one or more respective rays with respect to the environment map;
identify at least one respective interaction location of the one or more respective interaction locations as an occlusion;
generate a mask for the environment map based at least on the at least one respective interaction location identified as the occlusion, the mask indicating that the at least one respective interaction location corresponds to the occlusion; and
generate, based at least on the mask, an importance sampling function.

2. The system of claim 1, wherein, for individual pixels corresponding to one or more pixel locations, a single ray is traced within the scene.

3. The system of claim 1, wherein the one or more respective rays are traced in one or more randomly selected respective directions.

4. The system of claim 1, wherein the one or more processing units are further to:
estimate a pre-mask importance sampling function, wherein the one or more respective rays are traced based at least on the importance sampling function; and
update the importance sampling function.

5. The system of claim 1, wherein the one or more processing units are further to:
determine a source location from the environment map; and
select a respective direction to trace at least one respective ray of the one or more respective rays based at least on a respective position in the scene relative to the source location.

6. The system of claim 1, wherein the one or more processing units are further to update the mask for at least one frame in a video sequence.

7. The system of claim 1, wherein the one or more processing units are further to illuminate one or more objects of the scene as depicted in a frame based at least on the importance sampling function.

8. The system of claim 1, wherein the system is comprised in at least one of:
a human-machine interface system of an autonomous or semi-autonomous machine;
a system for performing conversational AI operations;
a system for performing simulation operations;
a system for performing digital twin operations;
a system for generating synthetic data;
a system for rendering simulated light transport;
a system for presenting or generating at least one of augmented reality (AR) content, virtual reality (VR) content, or mixed reality (MR) content;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

9. A method, comprising:
generating an importance sampling function using an environment map intensity;
allocating a mask for the environment map;
determining, for at least one rendering iteration, a first set of one or more random directions from at least one shaded point by importance sampling a reflectance function of a surface at the at least one shaded point;
tracing a first ray for at least one direction of the first set of one or more random directions and marking the corresponding environment map pixel when the first ray is unoccluded;
determining a second set of one or more random directions from the at least one shaded point by importance sampling the environment map using the importance sampling function;
tracing a second ray for at least one direction of the second set of random directions and marking the corresponding environment map pixel when the second ray is unoccluded;

applying multiple importance sampling to combine contributions using one or more rays traced from the first and second sets of one or more random directions and to generate an incoming radiance estimate for the at least one shaded point; and updating the importance sampling function using one or more of the marked environment map pixels.

10. The method of claim 9, further comprising using a non-binary mask by counting the number of unoccluded rays hitting each environment map pixel.

11. The method of claim 9, wherein the mask is one of a blank mask or a previously-computed mask.

12. The method of claim 9, further comprising updating the importance sampling function after a pre-determined number of iterations.

13. The method of claim 9, further comprising embedding the mask within the environment map.

14. The method of claim 13, further comprising storing the mask using a sign bit of a probability of at least one environment map pixel.

15. The method of claim 14, further comprising:

counting a number of unique environment map pixels in the mask;

using importance sampling function, prior to the updating, when the number is greater than a given threshold; and enabling the regeneration when the number becomes less than the threshold.

16. A processor comprising:

one or more processing units to:

generate an initial importance sampling function based at least on an environment map corresponding to a frame to be rendered;

trace, based at least on the initial importance sampling function, one or more rays corresponding to at least one pixel in the frame;

determine an occlusion status for at least one respective ray of the one or more rays with respect to the environment map; and generate a mask corresponding to the environment map, the environment map indicating the respective occlusion status of the at least one respective ray.

17. The processor of claim 16, wherein the one or more processing units are further to generate a second importance sampling function based at least on the mask.

18. The processor of claim 17, wherein the mask has a size substantially equivalent to a size of the environment map.

19. The processor of claim 18, wherein the mask is recalculated after a threshold number of frames associated with a video sequence including the frame.

20. The processor of claim 16, wherein the processor is comprised in at least one of:

a human-machine interface system of an autonomous or semi-autonomous machine;

a system for performing conversational AI operations;

a system for performing simulation operations;

a system for performing digital twin operations;

a system for generating synthetic data;

a system for rendering simulated light transport;

a system for presenting or generating at least one of augmented reality (AR) content, virtual reality (VR) content, or mixed reality (MR) content;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

* * * * *